(12) United States Patent
Ren et al.

(10) Patent No.: US 6,864,951 B1
(45) Date of Patent: Mar. 8, 2005

(54) TUNABLE ELECTRONIC LENS AND PRISMS USING INHOMOGENEOUS NANO SCALE LIQUID CRYSTAL DROPLETS

(75) Inventors: Hongwen Ren, Orlando, FL (US); Shin-Tson Wu, Oviedo, FL (US)

(73) Assignee: University of Central Florida, Orlando, FL (US)

( * ) Notice: Subject to any disclaimer, the term of this patent is extended or adjusted under 35 U.S.C. 154(b) by 135 days.

(21) Appl. No.: 10/141,582

(22) Filed: May 8, 2002

(51) Int. Cl.[7] ............... G02F 1/1335; G02F 1/1333; G02F 1/13; C09K 19/02
(52) U.S. Cl. ............... 349/200; 349/13; 349/86; 349/183
(58) Field of Search ............... 349/13, 86, 183, 349/200

(56) References Cited

U.S. PATENT DOCUMENTS

| | | | |
|---|---|---|---|
| 4,572,616 A | | 2/1986 | Kowel et al. ............... 350/335 |
| 5,093,735 A | * | 3/1992 | Doane ............... 349/92 |
| 5,299,289 A | | 3/1994 | Omae et al. ............... 359/95 |
| 5,764,317 A | | 6/1998 | Sadovnik et al. ............... 349/5 |
| 5,963,283 A | * | 10/1999 | Omae et al. ............... 349/86 |
| 6,061,107 A | | 5/2000 | Yang et al. ............... 349/86 |
| 6,072,552 A | | 6/2000 | Komura et al. ............... 349/86 |
| 6,128,056 A | * | 10/2000 | Kubota et al. ............... 349/86 |
| 6,184,954 B1 | | 2/2001 | Inoue et al. ............... 349/86 |
| 6,215,535 B1 | | 4/2001 | Nakajima et al. ............... 349/86 |
| 6,218,679 B1 | | 4/2001 | Takahara et al. ............... 257/59 |
| 6,221,443 B1 | | 4/2001 | Kubota et al. ............... 428/1.1 |
| 6,246,456 B1 | | 6/2001 | Inoue et al. ............... 349/86 |
| 6,331,881 B1 | | 12/2001 | Hatano et al. ............... 349/86 |
| 6,437,925 B1 | * | 8/2002 | Nishioka ............... 359/726 |
| 6,545,739 B1 | * | 4/2003 | Matsumoto et al. ............... 349/198 |
| 2001/0017675 A1 | | 8/2001 | Inoue et al. ............... 349/86 |

* cited by examiner

*Primary Examiner*—Robert H. Kim
*Assistant Examiner*—Hoan Nguyen
(74) *Attorney, Agent, or Firm*—Brian S. Steinberger; Law Office of Brian S. Steinberger, P.A.

(57) ABSTRACT

Using inhomogeneous sized liquid crystal (LC) droplets for lens and prisms. For forming a positive lens, the LC droplet size can gradually increase from the center to the side edges. For forming a negative lens, the LC droplet size can gradually decrease from the center to the side edges. The lens can be created by Ultra Violet light exposure to patterns. The lens can be tuned by applying voltage to the droplets. The inhomogeneous droplets can also be used in Fresnel lens and prisms. Applications of the invention can be used for eyeglasses, arrays, camera type zoom lenses and beam steering applications.

17 Claims, 13 Drawing Sheets

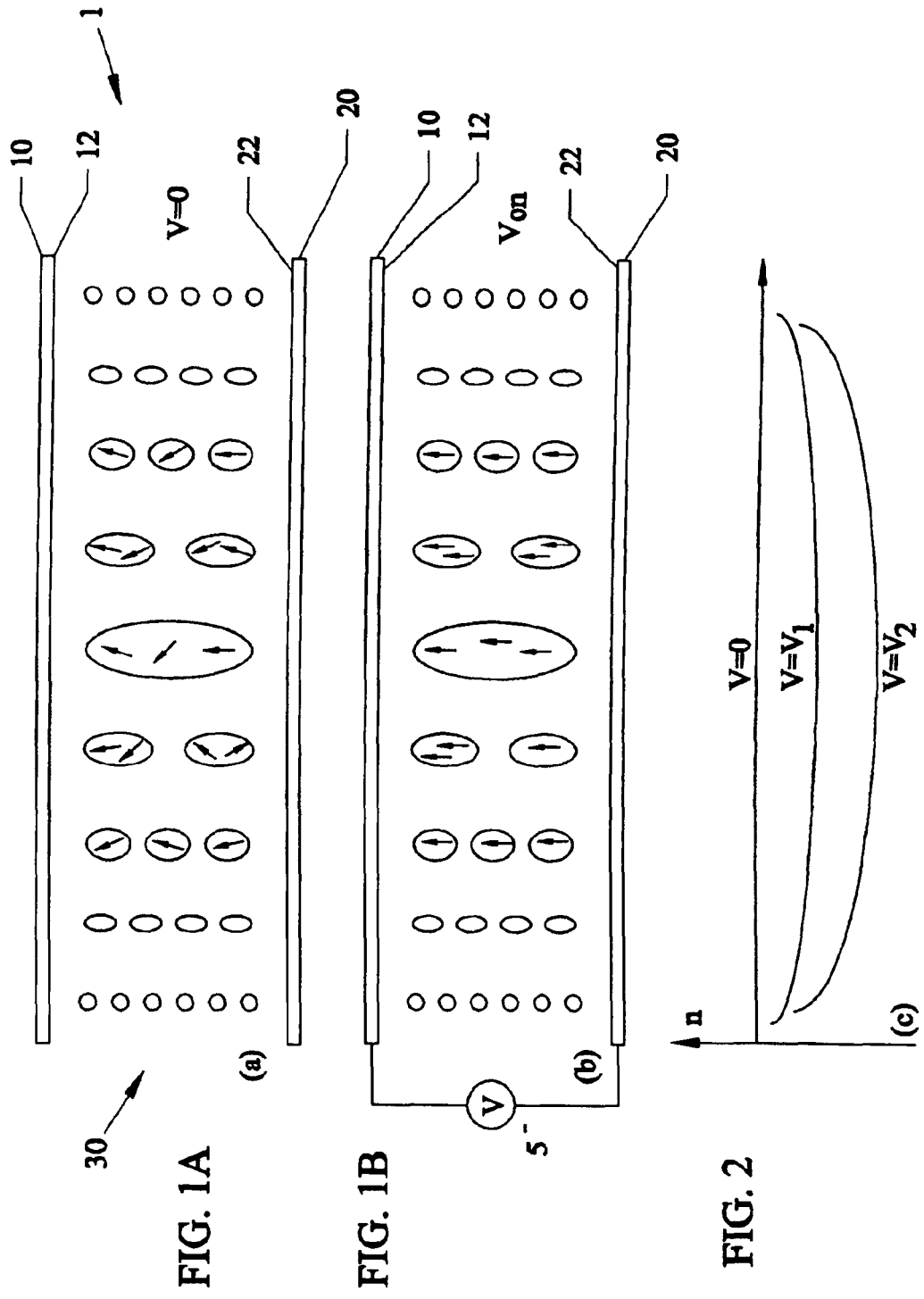

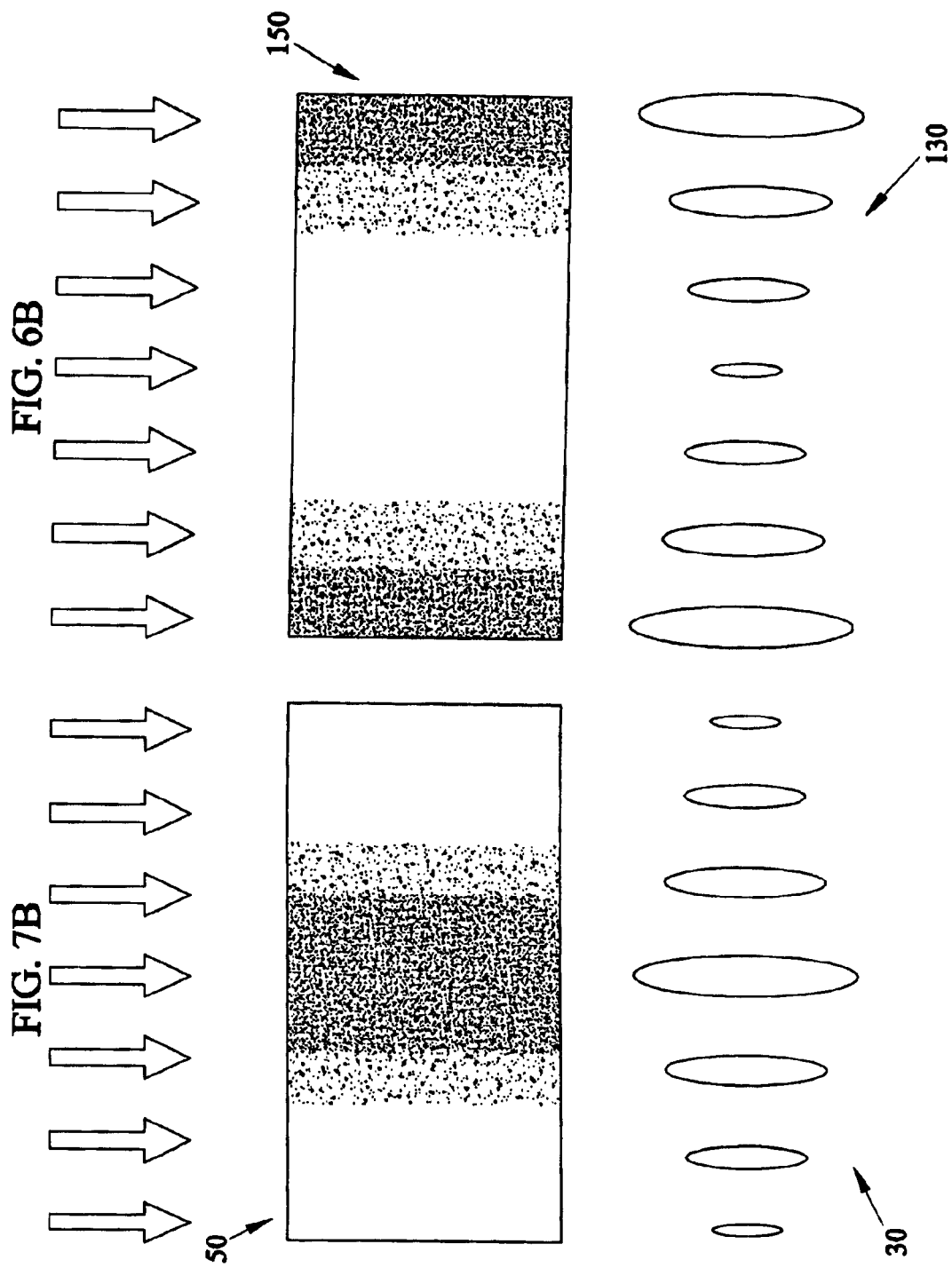

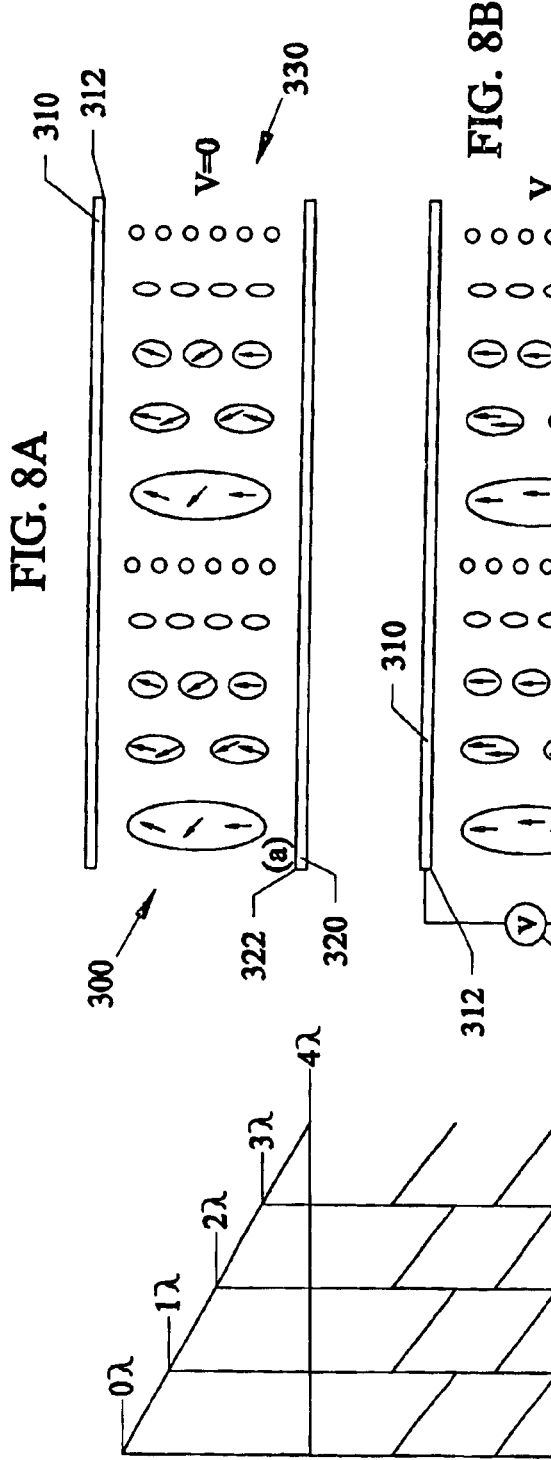
FIG. 8A
FIG. 8B
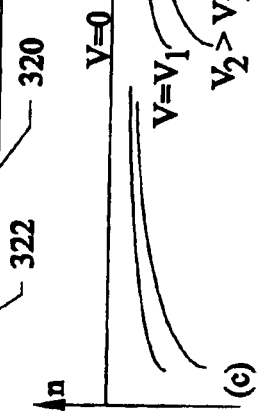
FIG. 9
FIG. 10

100 μm

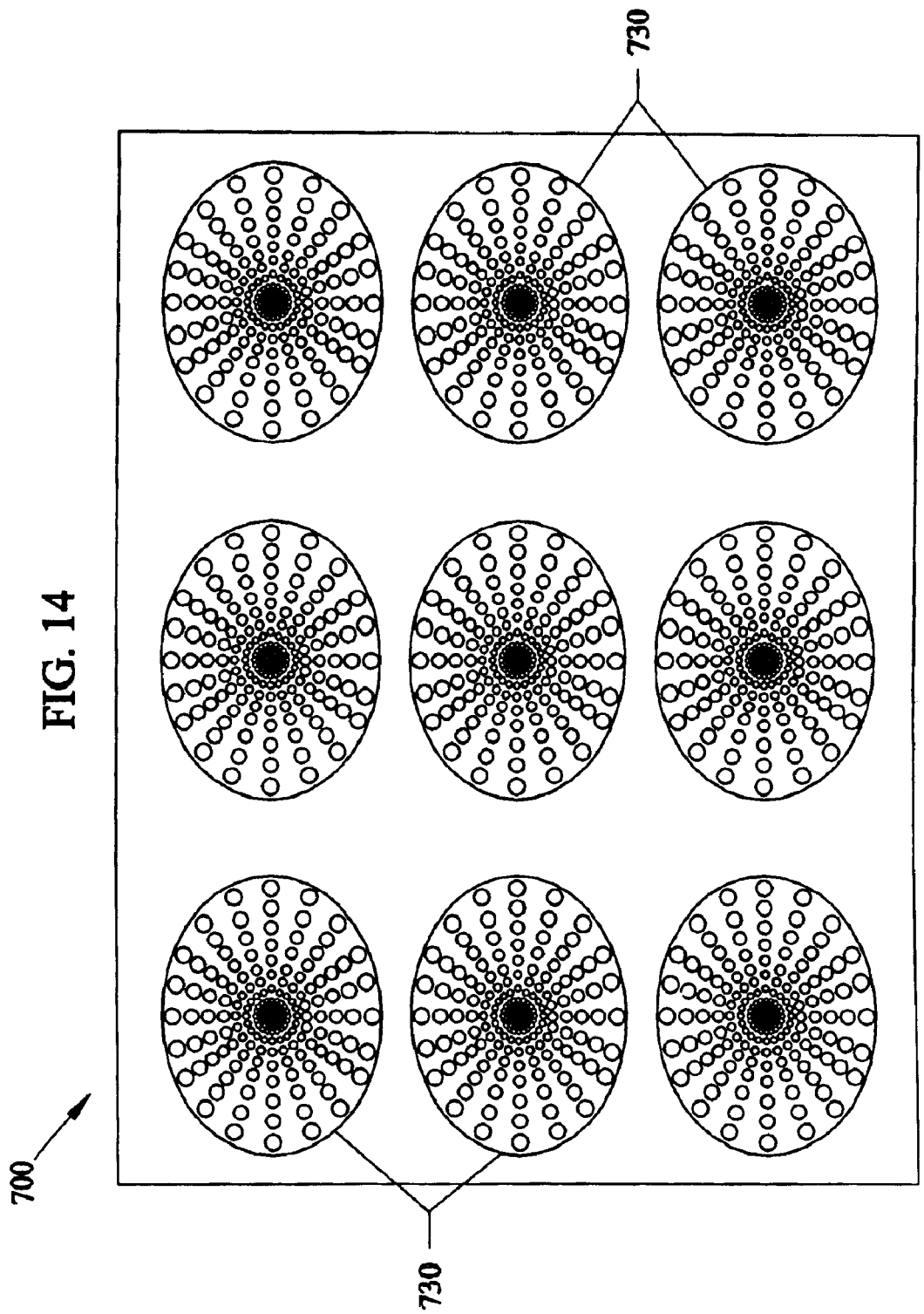

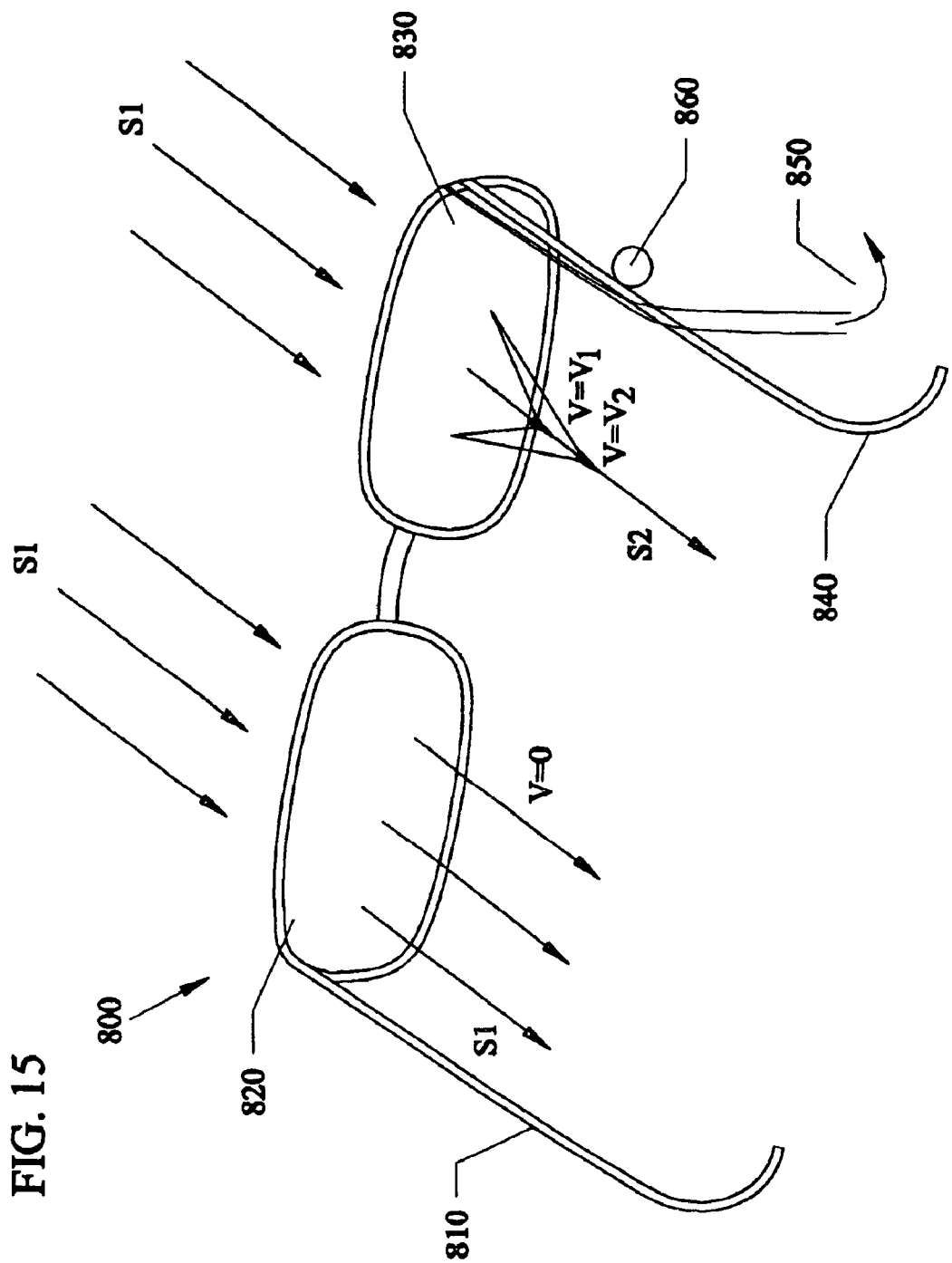

TUNABLE ELECTRONIC LENS AND PRISMS USING INHOMOGENEOUS NANO SCALE LIQUID CRYSTAL DROPLETS

This invention relates to liquid crystals, and in particular to methods and apparatus for using uneven inhomogeneous sized liquid crystal (LC) droplets for use as tunable electronic lenses and prisms, and this invention was funded in part under AFOSR(Air Force Office of Scientific Research) Contract number F49620-01-0377.

BACKGROUND AND PRIOR ART

Liquid crystal lens have been proposed over the years for selectively controlling the index of refraction of light passing through the lens. See for example, U.S. Pat. No. 4,572,616 to Kowel; and Sato, Liquid Crystal Lens-Cells with Variable Focal Length, Japanese Journal of Applied Physics, Vol. 18, No. 9, September 1979, pp.1679–1684. However, there have been problems with using the liquid crystals. Many of these devices require the liquid crystal material be aligned on convex curved substrates or concave curved substrates, where it is extremely difficult to align the liquid crystal molecules on the curved substrates. Additionally, most of these devices require linearly polarized light sources in order to operate.

In addition other types of devices also require the limitation of using linearized light sources along with other required features such as strip line electrodes. See also for example, Riza and DeJule, Three-terminal adaptive nematic liquid-crystal lens device, Optical Society of America, Vol. 19, No. 14 Optics Letters, Jul. 15, 1994, pp. 1013–1015.

Other types of liquid crystal lens require other features to work. Masuda et al., Liquid-crystal micro lens with a beam-steering function, Applied Optics, Vol. 36, No. 20, Jul. 10, 1997, pp. 4772–4778. requires the use of two polarizers to work as a micro lens.

Several other types of devices have been proposed for tunable liquid crystal lens. U.S. Pat. No. 4,907,860 to Noble 5,299,289 to Omae et al.; U.S. Pat. No. 5,764,317 to Sadovnik et al.; U.S. Pat. No. 6,061,107 to Yang et al. and U.S. Pat. No. 6,072,107 to Komura each describe conventional homogeneous liquid crystal droplets for use as a display panel and not as a tunable lens. U.S. Pat. Nos. : 6,184,954 and 6,246,456 and application 2001/0017675 to Inoue et al. describe other devices having homogenous liquid crystal droplets with no teaching for gradient distribution.

U.S. Pat. No. 6,221,443 to Kubota describes liquid crystal displays having droplets of substantially similar shapes and sizes, that are also not selected to be inhomogeneous. U.S. Pat. No. 6,218,679 to Takahara et al. describes homogeneous liquid crystal droplets that are much smaller than the wavelength of the incident light, and therefore do not scatter light and are transparent to visible light.

U.S. Pat. No. 6,215,535 to Nakajima et al. describes systems using liquid crystal droplets with distorted shapes, which result in scattering light and not focusing, diffracting nor deflecting light as needed with a lens.

U.S. Pat. No. 6,331,881 to Hatano et al. describes the fabrication method of a composite layer, including a resin and a cholesteric liquid crystal material. The resin wall takes the form of pillars or columns. Cholesteric liquid crystal reflects wavelength in the visible range. The formed structure is very different from the inhomogeneous nano-scaled PDLC droplets.

SUMMARY OF THE INVENTION

A primary objective of the invention is to provide a gradient-index liquid crystal lens with a tunable focal length.

A secondary objective of the invention is to provide tunable electronic lenses and prisms having inhomogeneous nano-scale polymer-dispersed liquid crystal (PDLC) droplets for use as broadband devices, in which wavelength is greater than droplet sizes.

A third objective of the invention is to provide tunable electronic lenses and prisms having inhomogeneous nano-scale polymer-dispersed liquid crystal (PDLC) droplets, which operate independent of incident light polarization.

A fourth objective of the invention is to provide tunable electronic lenses and prisms having inhomogeneous nano-scale polymer-dispersed liquid crystal (PDLC) droplets, which can be formed from simple fabrication processes.

A fifth objective of the invention is to provide tunable electronic lenses and prisms having inhomogeneous nano-scale polymer-dispersed liquid crystal (PDLC) droplets, which can be used as positive lens.

A sixth objective of the invention is to provide tunable electronic lenses and prisms having inhomogeneous nano-scale polymer-dispersed liquid crystal (PDLC) droplets, which can be used as negative lens.

A seventh objective of the invention is to provide tunable lenses and prisms for infrared applications.

The invention devices includes "gradient-index electronic lens" using inhomogeneous nano-sized liquid crystal/polymer composites. The refractive index profile of the inhomogeneous medium can be shaped by an applied voltage. This electronic lens can be a broadband device which can be suitable for white light operation. The device remains clear in the voltage on and off states. The effective focal length can be tuned by the applied voltage. The response time is estimated to be between approximately 0.2 and approximately 1 ms, depending on the employed droplet size. The invention can be used as either or both a positive lens or negative lens. Additional applications include a Fresnel lens, and an array of lens.

Further applications allow for the invention to be used as a prism, switchable prism, and array of prisms.

Further objects and advantages of this invention will be apparent from the following detailed description of a presently preferred embodiment which is illustrated schematically in the accompanying drawings.

BRIEF DESCRIPTION OF THE FIGURES

FIG. 1A shows a negative liquid crystal lens using the novel inhomogeneous liquid crystal droplet sizes of the invention with zero voltage applied.

FIG. 1B shows the negative liquid crystal lens of FIG. 1A with voltage being applied.

FIG. 2 shows a refractive index profile graph across a pixel of the lenses of FIGS. 1A and 1B with voltage applied at different levels.

FIG. 6B shows a side view of the positive photo mask of FIG. 6A with UV light and resultant droplets.

FIG. 7B shows a side view of the negative photo mask of FIG. 7A with UV light and resultant droplets.

FIG. 8A shows a side view of a prism device using inhomogeneous layer of liquid crystal droplets with no voltage(voltage equal to zero).

FIG. 8B is another view of the prism device of FIG. 8A with voltage greater than zero.

FIG. 9 shows a voltage plot of the prism device of FIGS. 8A–8B.

FIG. 10 shows a photo mask for fabricating inhomogeneous liquid crystal droplets for the prism device of FIGS. 8A, 8B and 9.

FIG. 14 shows a top view of a positive lens array using the novel inhomogeneous liquid crystal droplets.

FIG. 15 shows a perspective view of an eyeglasses application using the invention.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

The invention consists of using inhomogeneous nanoscale polymer-dispersed liquid crystal(PDLC) droplets that are supported between ITO(indium tin oxide) layers glass substrates, where the droplets are mixed within a polymer matrix and held in position between sandwiched glass or plastic substrates.

FIG. 1A shows a side cross-sectional view of a negative liquid crystal lens using the novel inhomogeneous liquid crystal droplet sizes of the invention with zero voltage applied. FIG. 1B shows the negative liquid crystal lens of FIG. 1A with voltage being applied. The lenses can have various dimensions depending on their application, and can have outer dimensions for example of approximately 5 cm by approximately 2 cm.

Figure 3A:
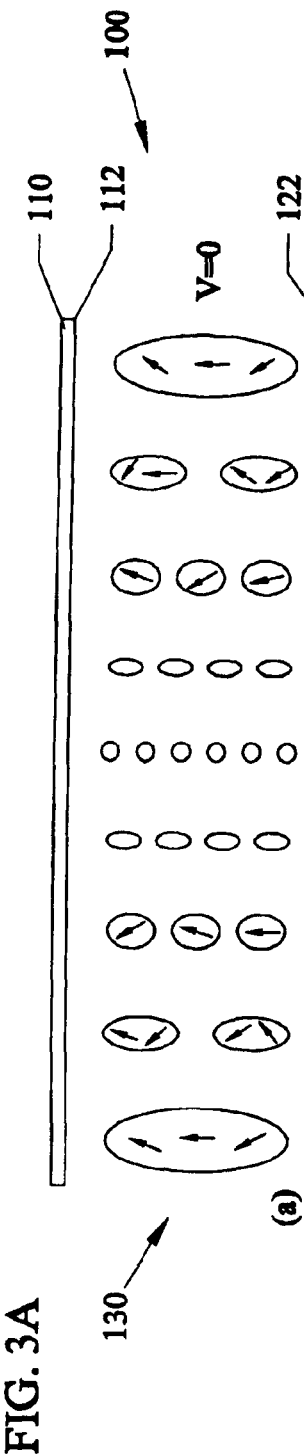
FIG. 3A shows a positive liquid crystal lens using the novel inhomogeneous liquid crystal droplet sizes of the invention with a zero voltage applied.
Figure 3B:
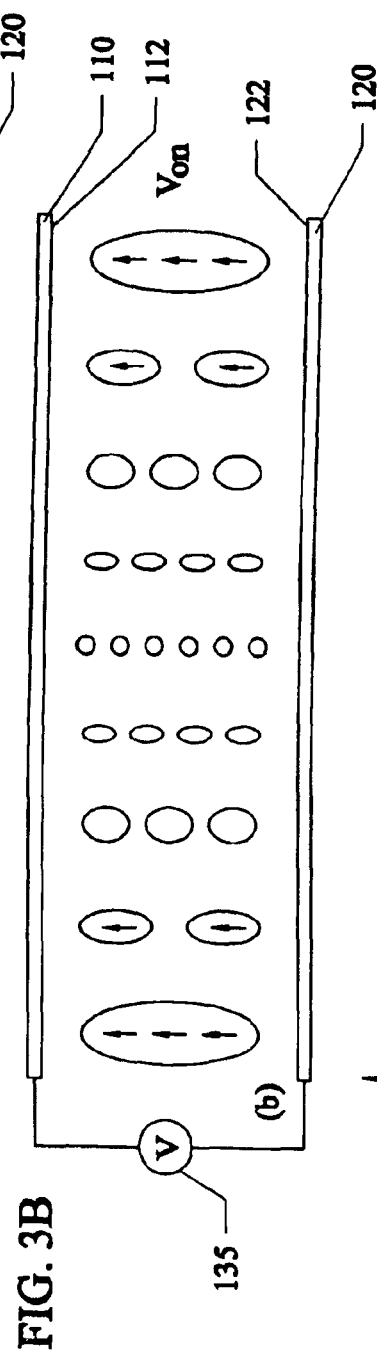
FIG. 3B shows the positive liquid crystal lens of FIG. 3A with voltage being applied.

Referring to FIGS. 1A–1B, the LC droplet sizes gradually decrease from center to edges, and in FIGS. 3A–3B, the droplet sizes gradually increase from center to edges.

Referring to FIGS. 1A–1B, for the negative lens 1, the droplets 30 can be positioned between glass substrates 10, 20 each having inwardly facing indium tin oxide(ITO) surface layers 12, 22, with a voltage supply 5 supplying voltage to the ITO layers 12, 22. Referring to FIG. 2, the Y axis refers to the refractive index at different uniformly applied voltages of V=0, V=$V_1$, or V=$V_2$, respectively with the X axis showing the corresponding refractive index across the different droplet sizes. For example, the refractive index of the large sized droplets in the center of the negative lens is substantially different(lower) than the refractive index of the droplets at the outer side edges of the lens.

Figure 4:
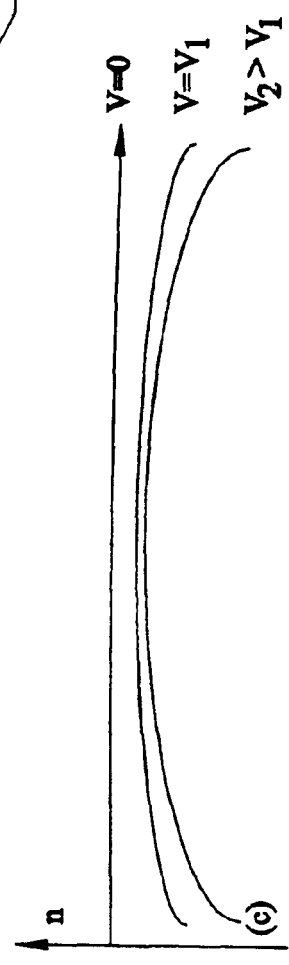
FIG. 4 shows a refractive index profile across a pixel of the lenses of FIGS. 3A and 3B with voltage applied at different levels.

Referring to FIGS. 3A–3B, for the positive lens 100, the droplets 130 can be positioned between glass substrates 110, 120 each having inwardly facing indium tin oxide(ITO) surface layers 112, 122, with a voltage supply 105 supplying voltage to the ITO layers 112, 122. Referring to FIG. 4, the Y axis refers to the refractive index at different uniformly applied voltages of V=0, V=$V_1$, or V=$V_2$, respectively with the X axis showing the corresponding refractive index across the different droplet sizes. For example, the refractive index of the large sized droplets in the center of the negative lens is substantially different than the refractive index of the droplets at the outer side edges of the lens, with the refractive index in the middle of the droplets 130 higher than that at the outer edges.

Figure 5A:
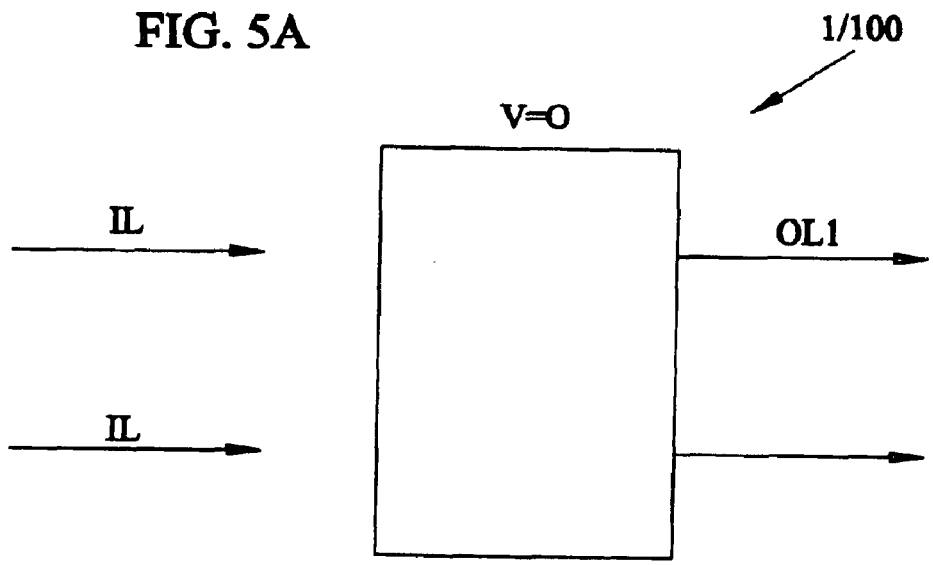
FIG. 5A shows an exemplary embodiment application of using the positive lens or the negative lens of the preceding figures with voltage equal to zero.
Figure 5B:
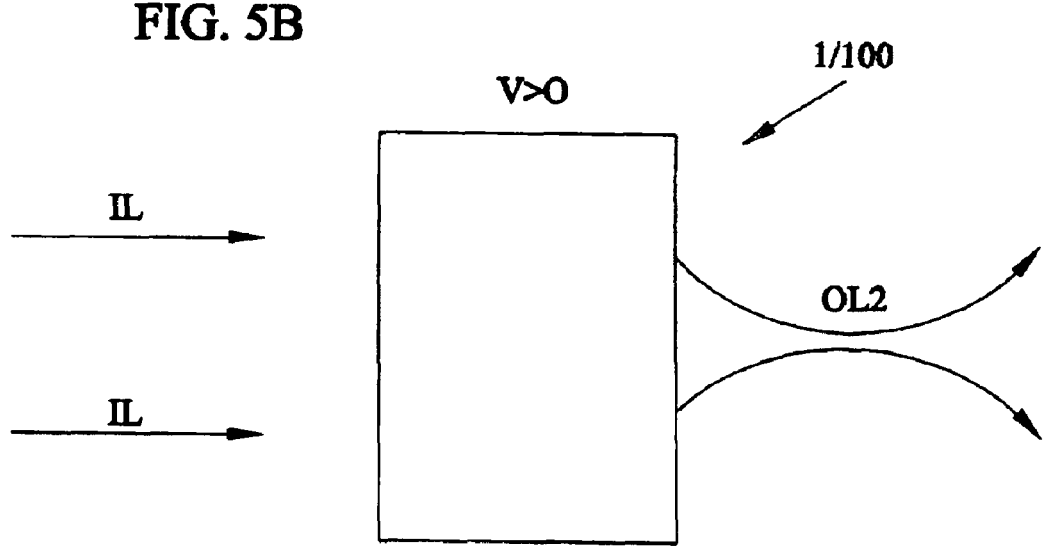
FIG. 5B shows FIG. 5A with voltage greater than zero.

FIG. 5A shows an exemplary embodiment application of using the positive lens 100 or the negative lens 1 of the preceding figures. FIG. 5B shows FIG. 5A with voltage greater than zero. Referring to FIGS. 5A, 5B, voltage equal to zero, and IL referring to an input light source such as input ultra violet radiation, and OL1 and OL2 referring respectively to output light at V=0, and output light at V>0.

Figure 6A:
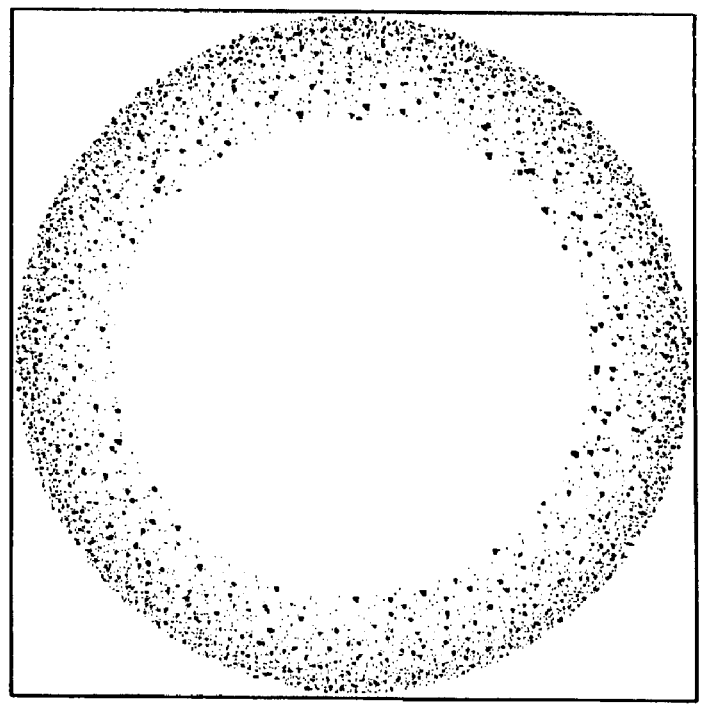
FIG. 6A shows a photo mask for fabricating inhomogeneous liquid crystal droplets for the positive lens of FIGS. 1A–1B.

These inhomogeneous droplet size distributions shown in FIGS. 1A–1B and 3A–3B, can be easily fabricated by exposing UV light to the LC/monomer mixture through a positive and negative patterned masks, as shown in FIGS. 6A–6B which show front views of respective masks 50, 150. In the brighter region, the polymerization rate is faster resulting in a smaller LC droplet. In the weaker UV exposure regions, the droplet sizes are larger.

Referring again to FIGS. 6A–6B, the novel photo masks 50, 150 can have a circular shape and can be formed from a glass type material with varying degrees of a reflective coating thereon such as those found in a variable density filter, and the like. For the positive lens photo mask 150 of FIG. 6A, glass opaqueness can increase linearly from the center to the outer side edges. For the negative lens photo mask 50 of FIG. 6B, opaqueness can decrease linearly from the center to the outer edges.

Figure 7A:
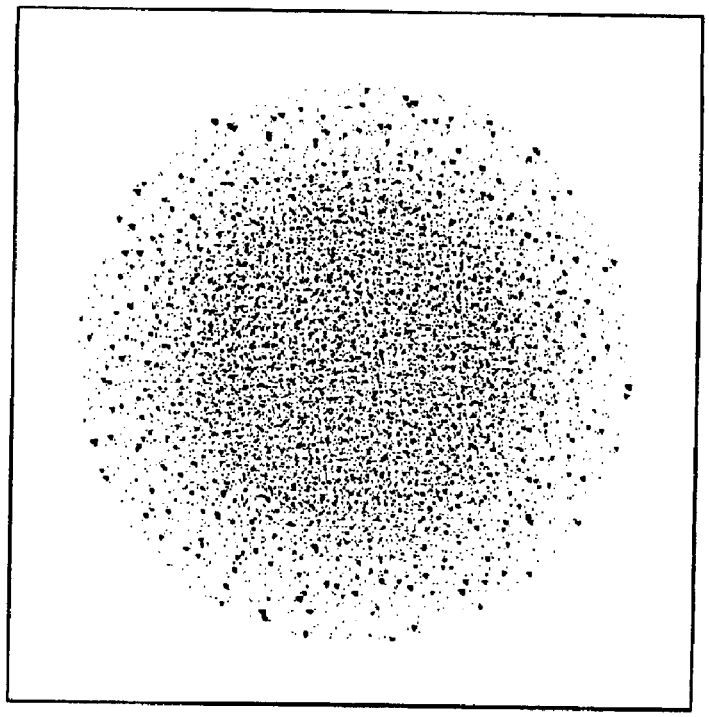
FIG. 7A shows a photo mask for fabricating inhomogeneous liquid crystal droplets for the negative lens of FIGS. 3A–3B.

FIGS. 7A and 7B show side views of the novel negative mask 50 and positive mask 150 with ultraviolet(UV) light passing through the masks 50, 150 causing originally uniform droplets(not shown) to turn into inhomogeneous droplets 30, 130, respectively.

These gradient droplet sizes can vary from approximately few nanometers to micrometers, depending on demands, and can vary for example from approximately 10 nanometers to approximately 1 micron. For infrared (IR) radiation, the droplet sizes could increase before scattering takes place. Thus, the droplets can be transparent to white light.

Referring to FIG. 1A, in the voltage OFF state, the device is transparent and no light scattering is observed even though the LC droplet directors are randomly oriented(see arrows being in random directions). This is because the droplet sizes are much smaller than the wavelength.

As the voltage is applied to the cell as shown in FIG. 1B to V=V₁ and V=V₂ which can be selected values up to and less than approximately 200 volts, the LC directors inside the droplets are reoriented along the electric field direction. The turn ON voltage of such LC composite depends on the droplet sizes: the smaller the droplet, the higher the threshold voltage. As a result, the gradient refractive index profile is generated.

FIG. 2 shows a refractive index profile graph across a pixel of the lenses of FIGS. 1A and 1B with voltage applied at different levels. The area with a larger droplet size would exhibit a lower refractive index, as shown by V2 compared to V1 compared to 0.

FIG. 3A shows a positive liquid crystal lens using the novel inhomogeneous liquid crystal droplet sizes of the invention with a zero voltage applied. Droplets 130 are positioned between glass substrates 1110, 120 within ITO layers 112, 122, respectively. FIG. 3B shows the positive liquid crystal lens of FIG. 3A with voltage 135 being applied to ITO layers 122, 132. Referring to FIGS. 3A–3B the droplet sizes can gradually increase from center areas of the cell to edges of the cell. These inhomogeneous droplet size distributions can be easily fabricated by exposing UV light to the LC/monomer mixture through a patterned mask, as shown in FIGS. 6A and 6B. In the brighter region, the polymerization rate is faster resulting in a smaller LC droplet. In the weaker UV exposure regions, the droplet sizes are larger. Similar to the embodiment of preceding FIGS. 1A–1B, these gradient droplet sizes can vary from approximately a few nanometers to micrometers, depending on demands. Thus, they are transparent to white light. As shown in FIG. 4, the refractive index in the middle of the positive lens 100 is higher than the refractive index the outer side edges of the droplets 130.

In the voltage OFF state of FIG. 3A, the device is transparent and no light scattering is observed even though the LC droplet directions (arrows) are randomly oriented. This is because the droplet sizes are much smaller than the wavelength. As the voltage is applied to the cell device as shown by FIG. 3B, the LC directors inside the droplets are reoriented along the electric field direction. The turn ON voltage of such LC composite depends on the droplet sizes: the smaller the droplet, the higher the threshold voltage. As a result, the gradient refractive index profile is generated. Referring to FIG. 3B, in the voltage ON state, the refractive index decreases radically from center to edges.

FIG. 4 shows a refractive index profile across a pixel of the lenses of FIGS. 3A and 3B with voltage applied at different levels. The higher the voltage (V₂>V₁), the larger the refractive index change, as shown in FIG. 4.

FIG. 8A shows a side view of a prism device 300 using inhomogeneous layer of liquid crystal droplets with no voltage (voltage equal to zero). Droplets 330 are positioned between glass substrates 310, 320 within ITO layers 312, 322, respectively. FIG. 8B is another view of the prism device of FIG. 8A with voltage 305 being applied to the ITO layers 312, 322 that is greater than zero (V=V₁, V=V₂, respectively). FIG. 9 shows a voltage plot of the prism device of FIGS. 8A–8B.

FIG. 10 shows a photo mask 350 for fabricating inhomogeneous liquid crystal droplets 330 for the prism device of FIGS. 8A, 8B and 9. The inhomogeneous droplets 330 can be formed in a similar manner to the positive and negative lens described above in reference to FIGS. 6B and 7B.

Figure 11:
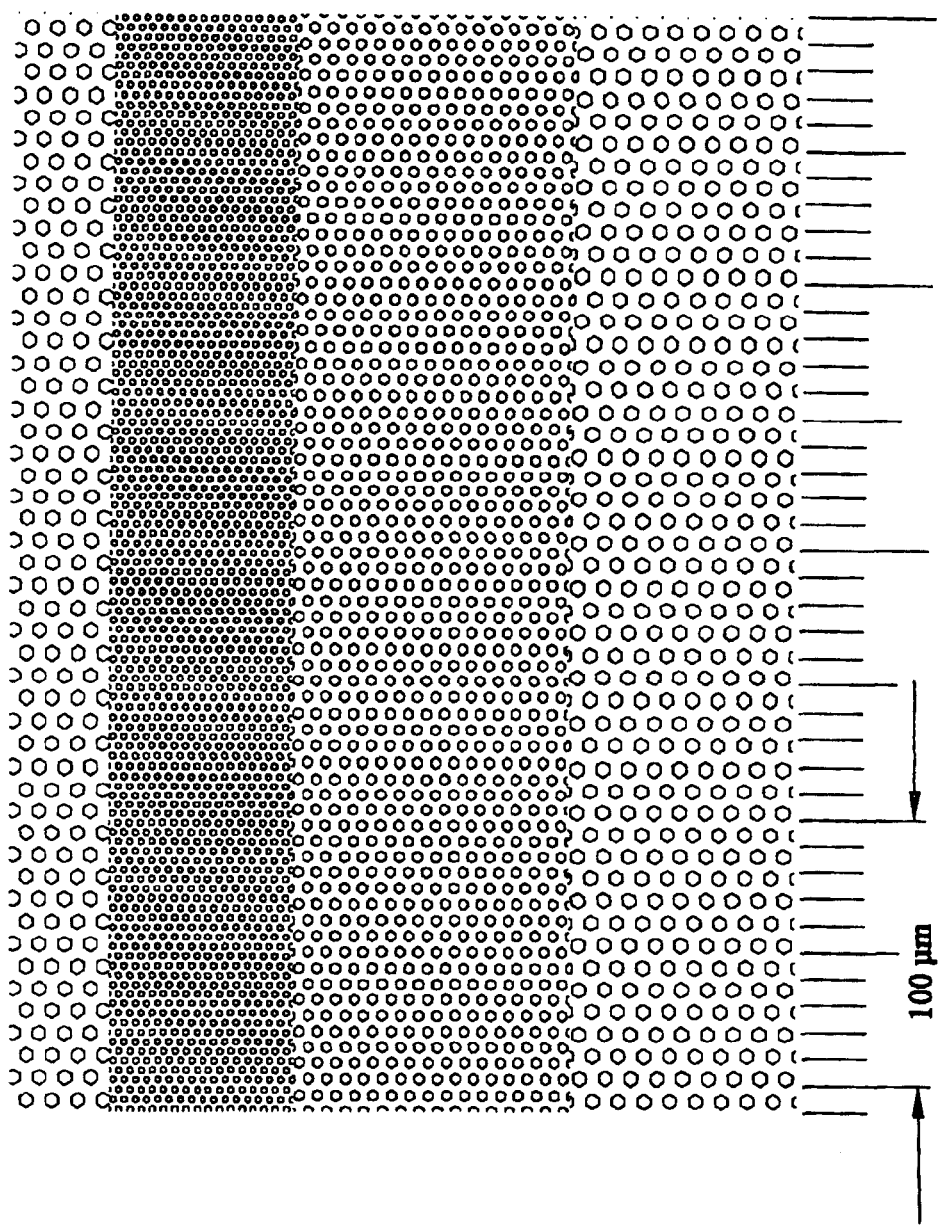
FIG. 11 shows a microscope image of a distribution of inhomogeneous liquid crystal droplets according to the invention.

FIG. 11 shows a microscope image of a distribution of inhomogeneous liquid crystal droplets according to the invention. The inventors have reduced to practice the invention by performing an experiment for generating inhomogeneous LC droplet size distribution. FIG. 10 shows the microscope photograph of a sample. In such experiment, we mixed E7 LC material (from Merck Corp.) with Norland (NoA65) monomer (NOA65) at 30:70 ratio(approximately 30% liquid crystal to approximately 70% monomer).

For the experimentation, a photomask with period prism grating was used for UV (ultra violet) exposure. The exposure time was approximately 20 seconds at an intensity of approximately 37 mw/cm². The LC cell gap was approximately 10 m, sandwiched between two ITO/glass substrates. Referring to FIG. 11, the individual droplet size varied from approximately 51 μm to about approximately 500 nm. The area with lower UV dosage exhibits a larger droplet size and the area with a higher exposure shows a smaller droplet size. The higher energy UV photons triggered a faster phase separation which resulted in a smaller droplet size.

By spatially repeating these prism or lens processes, an array of switchable prism or lens with a large dynamic range can be achieved by splitting middle pixels in the lens. This new optical phased array can also be used for broadband beam steering.

The invention can also be used to fabricate Fresnel lens using a circular patterned mask. The process is relatively simple and the associated cost is low.

Figure 12B:
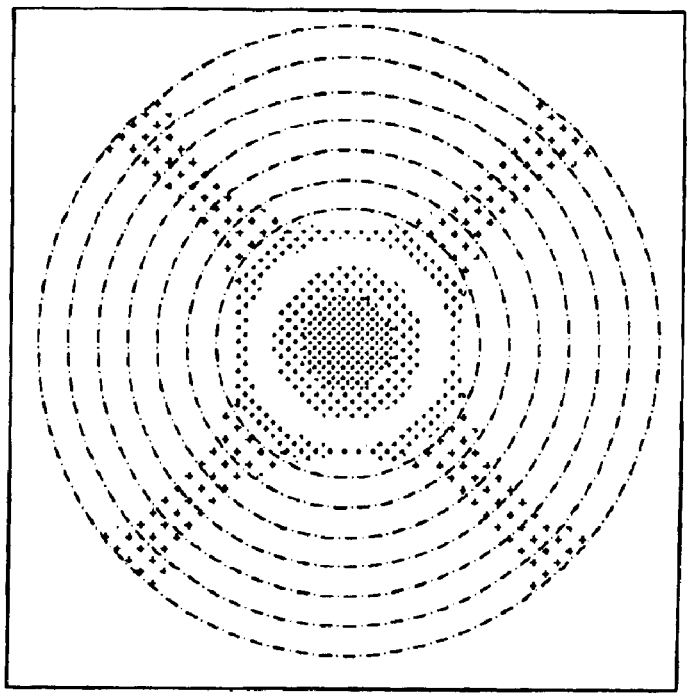
FIG. 12B shows a front surface of a negative Fresnel lens mask according to the invention.
Figure 12A:
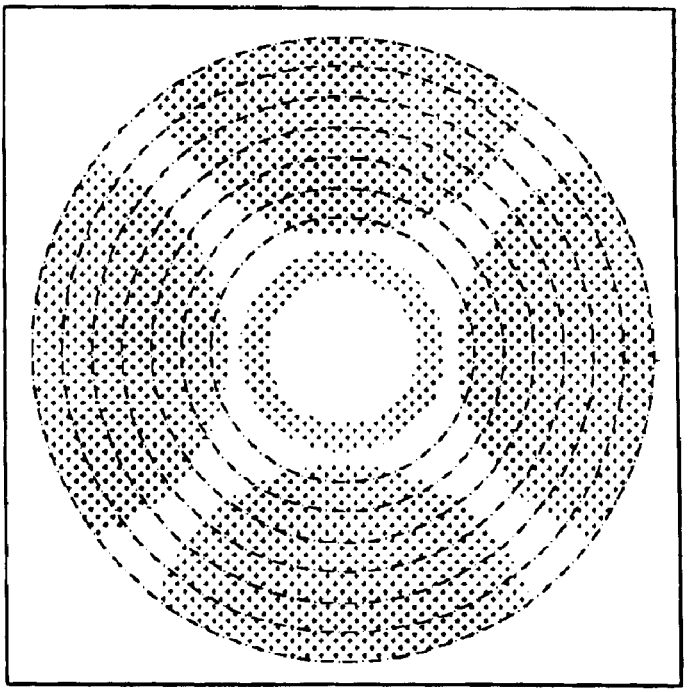
FIG. 12A shows a front surface of a positive Fresnel lens mask according to the invention.

FIG. 12A shows a front surface of a positive Fresnel lens mask 300 according to the invention. For the positive Fresnel lens mask 300, concentric rings on the glass substrate can have a uniform opaqueness, where opaqueness zones between the rings increasing linearly from the center to the outer side edges.

FIG. 12B shows a front surface of a negative Fresnel lens mask 400 according to the invention. For the negative Fresnel lens mask 400, the concentric rings can have a uniform opaqueness, and the opaqueness zones between the rings can decrease linearly from the center to the outer side edges.

The inhomogeneous droplets of the Fresnel lens can be formed using these respective masks 300, 400 following similar layouts as that previously described above for forming other previously described lenses and prisms.

Figure 13:
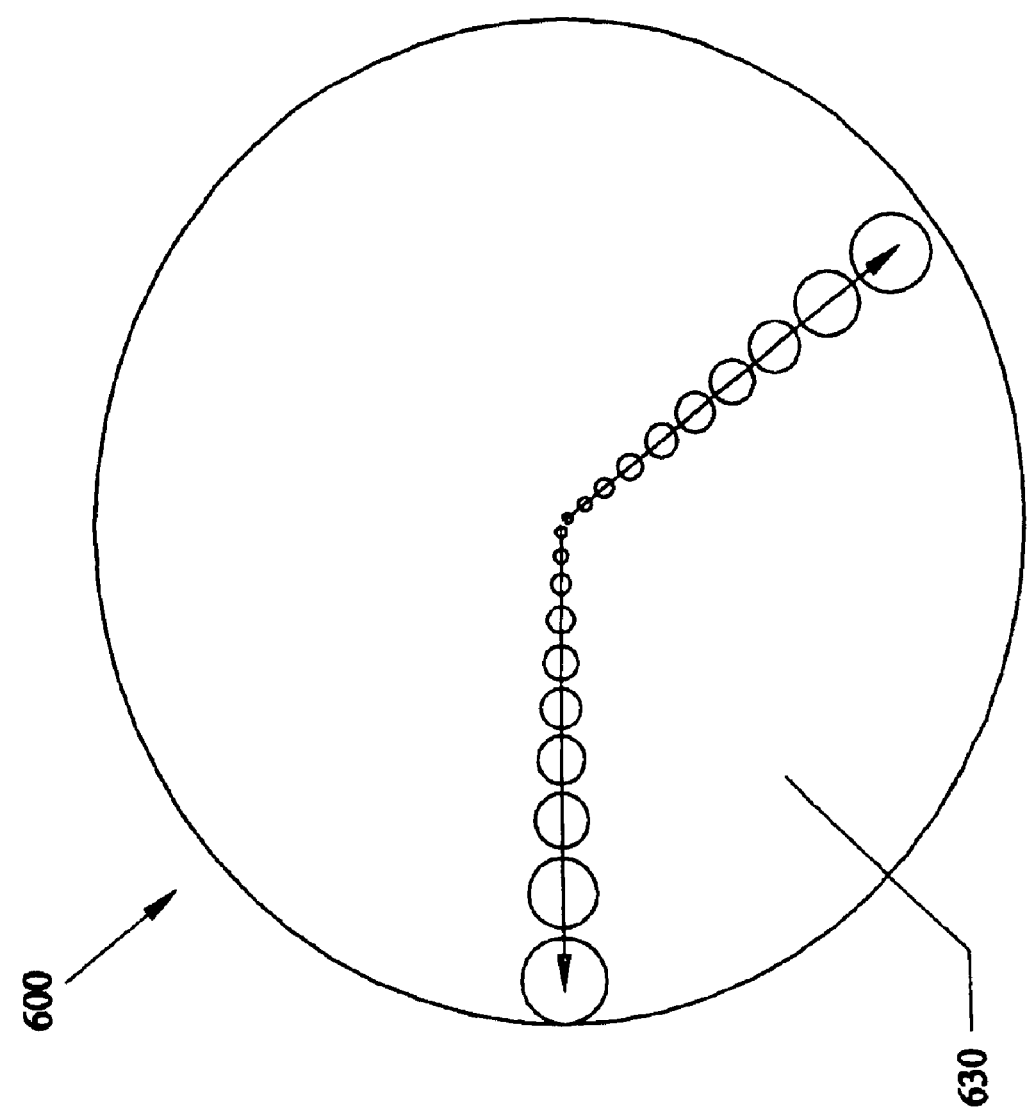
FIG. 13 shows a top view of a positive lens using the inhomogeneous droplets.

FIG. 13 shows a top view of a positive lens 600 using the inhomogeneous droplets 630. As clearly shown the droplet sizes increase radically from the center of the lens to the outer side edges.

FIG. 14 shows a top view of a positive lens array 700 using the novel inhomogeneous liquid crystal droplets each arranged on parallel rows of circular type lenses 730. The array 700 can use the individual positive lenses depicted previously in reference to FIGS. 3A, 3B, 6A and 6B.

FIG. 15 shows a perspective view of an eyeglasses application 800 using the invention. The invention can have applications for use with eyeglasses, allowing the wearer to be able to adjust focus electronically and eliminating the frequent need to have new lenses made. The invention can allow for optometrists to find ideal prescriptions for their patients by allowing continual lens adjustment instead of them having to flip back and forth between lenses when fitting lenses.

Referring to FIG. 15, one or both lens 820, 830 in a set of eyeglasses can be fitted with the positive or negative tunable lenses that were previously described. A power supply 850 such as a battery, and the like, can be attached to one of the eye glass support arms 810, 840, and can supply power to one and/or both of the lenses 820, 830, respectively. A control switch 860 such as a rheostat type switch, can be used to tune the focused light S1 that passes through either or both the lenses 820, 830 to be more focused(see S2). As previously described, different levels of voltage($V=V_1$, $V=V_2$, and the like), can be applied to adjust the lenses 820, 830.

Figure 16B:
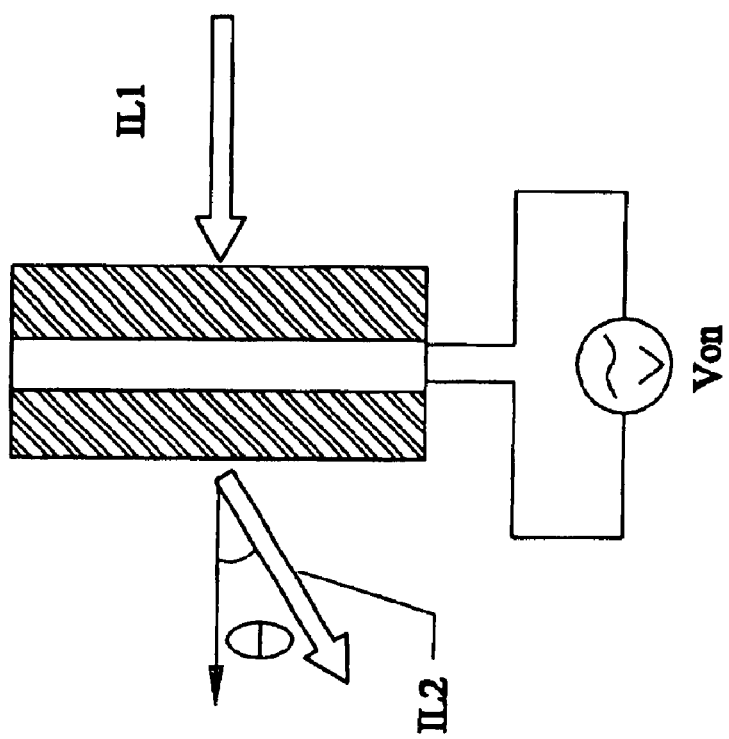
FIGS. 16A–16B shows a beam steering application using the invention.
Figure 16A:
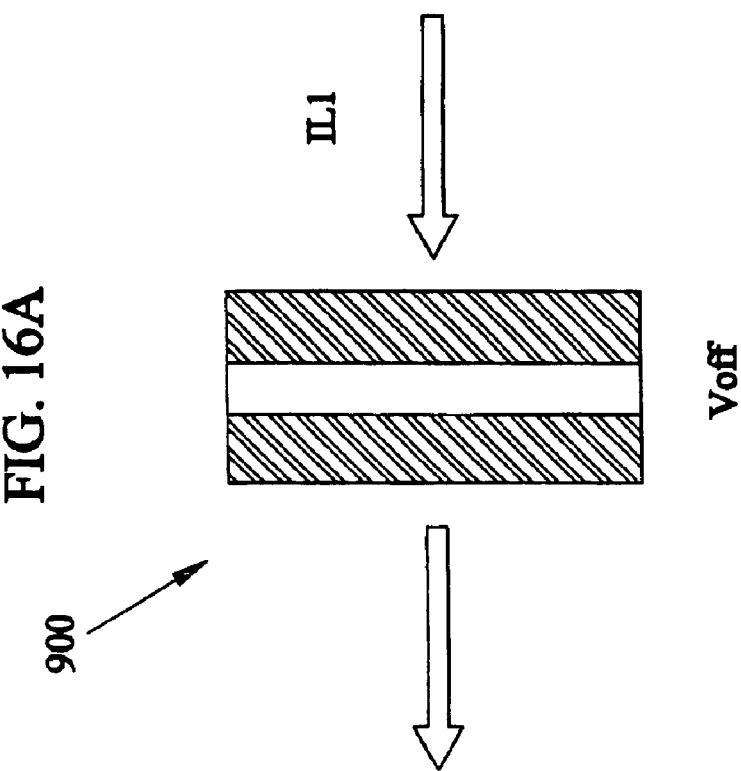

FIGS. 16A–16B shows a beam steering application 900 of using the invention. Here, white light beam steering can use an electronic prism 900 such as the prisms previously described. In the voltage off state(Voff) of FIG. 16A, incoming light L1 passes through the prism and remains unchanged going through the prism 900 in a straight direction. In the voltage on state(Von), the incoming light IL1 beam is deflected at an angle. The deflection angle can be controlled by the applied voltage.

Figure 17:
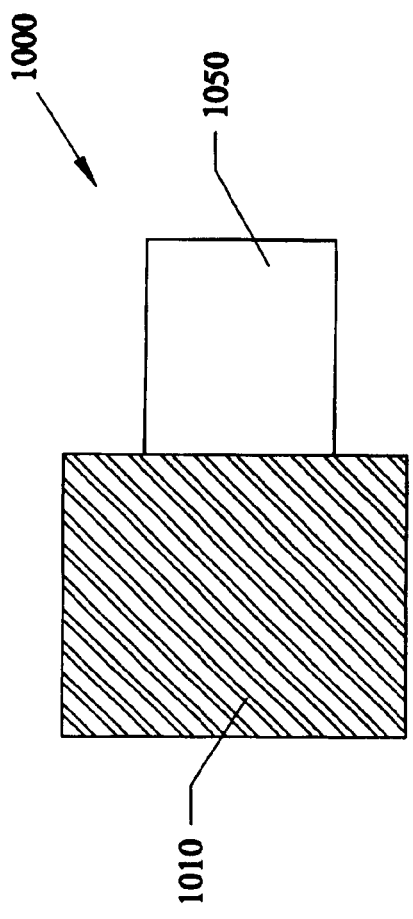
FIG. 17 shows a side view of a prior art zoom camera.
Figure 18:
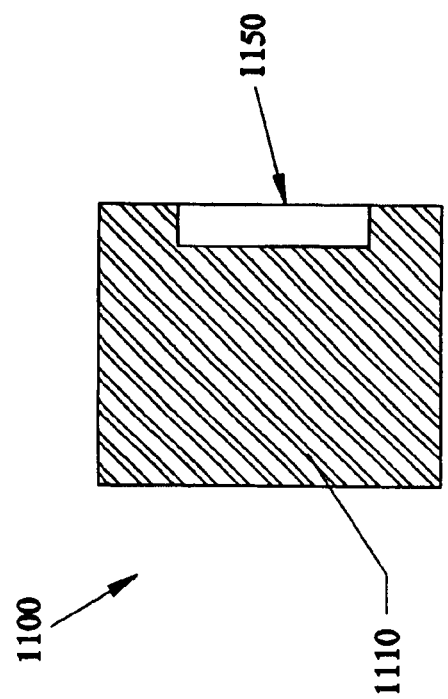
FIG. 18 shows a side view of a novel zoom camera with a novel lens.

FIG. 17 shows a side view of a prior art zoom camera 1000 having a basic camera body 1010 with a mechanically rotatable zoom type lens 1050. FIG. 18 shows a side view of a novel zoom camera 1100 with a novel lens 1150 that incorporates the novel inhomogeneous droplets lens described in the subject invention. By applying a voltage to the inhomogeneous liquid crystal cell, the focal length of the camera 1100 can be adjusted. The invention enables for the size of cameras to be more compact and light weight than existing cameras that use mechanical zoom type lenses.

The invention has additional applications in addition to those described above. For example, the invention can be used with projection displays, other optometry applications, and for uses in telecommunications, and the like.

In order to achieve the tunable focusing effect, the photomask should have a circular intensity variation, rather than linear grating as we used for the experiment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A tunable negative lens, comprising:

an inhomogeneous layer of liquid crystal droplets, wherein sizes of the liquid crystal droplets Gradually decrease from a center of the layer to side edges of the layer;

means for passing a light source through the layer; and means for tuning the layer to form the tunable negative lens.

2. The tunable lens of claim 1, wherein the inhomogeneous layer includes:

nano-scale size liquid crystal droplets.

3. The tunable lens of claim 2, wherein the inhomogeneous layer includes:

polymer-dispersed liquid crystal droplets.

4. The tunable lens of claim 1, further comprising:

means for tuning at least one lens of a pair of eyeglasses with the lens.

5. The tunable lens of claim 1, further comprising:

means for attaching the lens to a camera for use as a zoom lens.

6. A tunable positive lens, comprising:

an inhomogeneous layer of liquid crystal droplets, wherein sizes of the liquid crystal droplets gradually increase from a center of the layer to side edges of the layer;

means for passing a light source through the layer; and means for tuning the layer to form the tunable positive lens.

7. The tunable lens of claim 6, wherein the inhomogeneous layer includes:

nano-scale size liquid crystal droplets.

8. The tunable lens of claim 6, wherein the inhomogeneous layer includes:

polymer-dispersed liquid crystal droplets.

9. The tunable lens of claim 6, further comprising:

means for tuning at least one lens of a pair of eyeglasses with the lens.

10. The tunable lens of claim 6, further comprising:

means for attaching the lens to a camera for use as a zoom lens.

11. An electronic liquid crystal lens, comprising:

an inhomogeneous layer of liquid crystal droplets wherein sizes of the liquid crystal droplets gradually change from a center of the layer to side edges of the layer;

a light source for directing light through the layer; and a voltage source applied to the layer to form the electronic lens.

12. The lens of claim 11, wherein the sizes of the liquid crystal droplets gradually decreases from the center of the layer to the side edges of the layer, forming a negative lens.

13. The lens of claim 11, wherein the sizes of the liquid crystal droplets gradually increases from the center of the layer to the side edges of the layer, forming a positive lens.

14. The lens of claim 11, wherein the inhomogeneous layer includes:

nano-scale size liquid crystal droplets.

15. The lens of claim 11, wherein the inhomogeneous layer includes:

polymer-dispersed liquid crystal droplets.

16. The lens of claim 11, further comprising:

means for using at least one lens of a pair of eyeglasses with the lens.

17. The lens of claim 11, further comprising:

means for attaching the lens to a camera for use as a zoom lens.

* * * * *

UNITED STATES PATENT AND TRADEMARK OFFICE
CERTIFICATE OF CORRECTION

| | | |
|---|---|---|
| PATENT NO. | : 6,864,951 B1 | Page 1 of 1 |
| APPLICATION NO. | : 10/141582 | |
| DATED | : March 8, 2005 | |
| INVENTOR(S) | : Hongwen Ren | |

It is certified that error appears in the above-identified patent and that said Letters Patent is hereby corrected as shown below:

In the Specification

Col. 1, Line 5

STATEMENT REGARDING FEDERALLY SPONSORED RESEARCH OR DEVELOPMENT
should read --

This invention was made with Government support under Agency contract F49620-01-1-0377 awarded by the United States Air Force/Air Force Office of Scientific Research. The Government has certain rights in this invention.

Signed and Sealed this
Eighteenth Day of February, 2014

Michelle K. Lee
*Deputy Director of the United States Patent and Trademark Office*